Sept. 15, 1936.    R. L. STIRLING ET AL    2,054,143
FIELD MOTOR TRUCK
Filed Aug. 20, 1934    2 Sheets-Sheet 1

INVENTORS
Robert Lester Stirling
BY  Knud J. W. Freitag
Miller Boyken & Bried
ATTORNEYS.

Sept. 15, 1936.                R. L. STIRLING ET AL                2,054,143
                                  FIELD MOTOR TRUCK
                            Filed Aug. 20, 1934          2 Sheets-Sheet 2
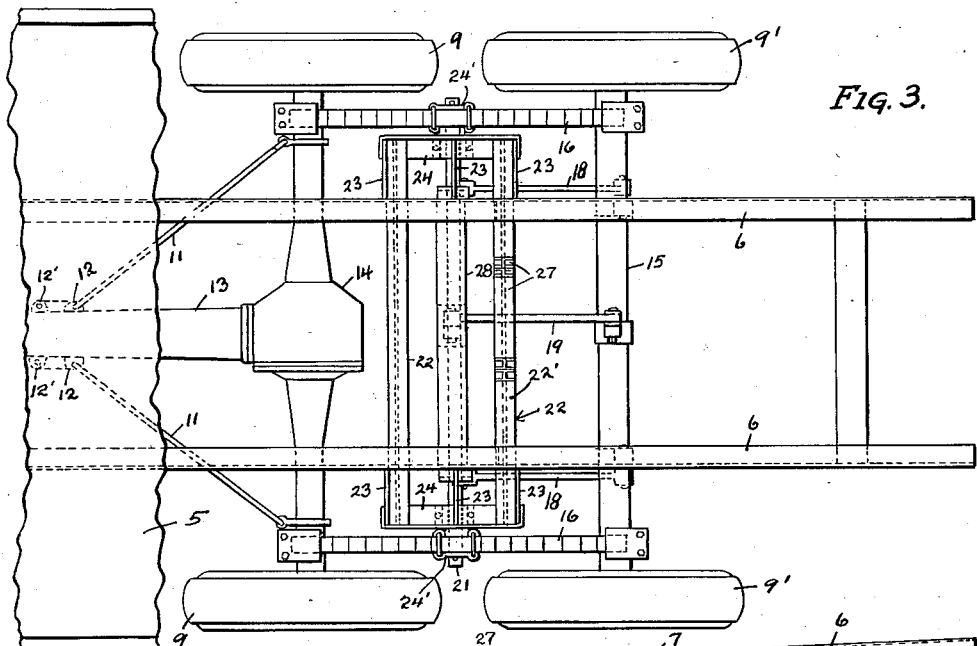
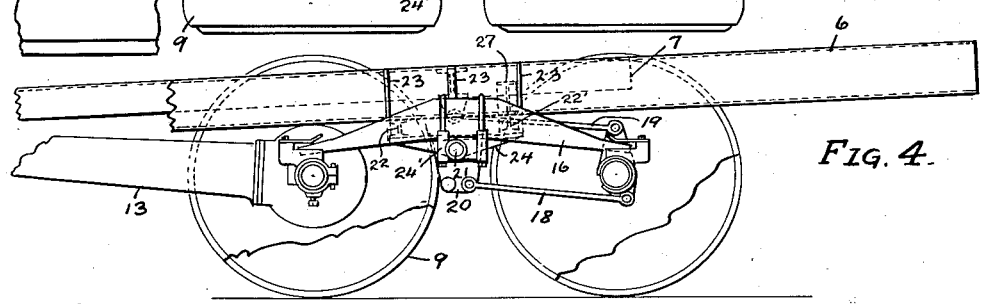
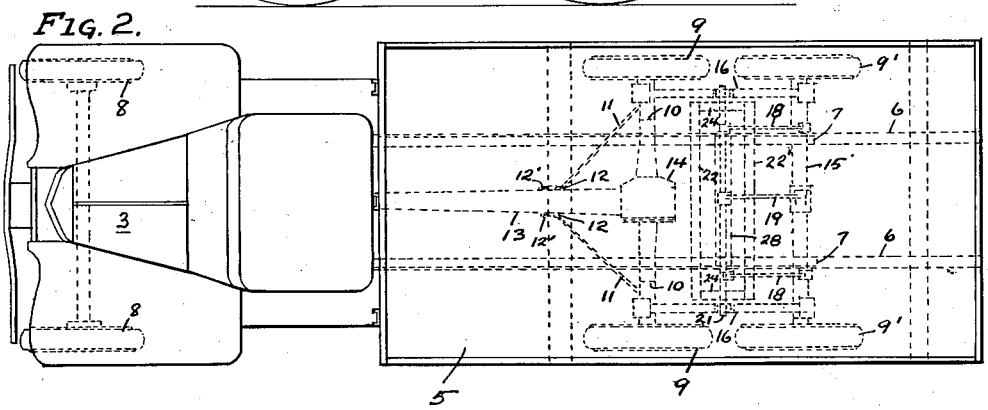
INVENTORS
Robert Lester Stirling
Knud J. W. Freitag
BY Miller Boykin & Bried
ATTORNEYS.

Patented Sept. 15, 1936

2,054,143

UNITED STATES PATENT OFFICE 2,054,143

FIELD MOTOR TRUCK

Robert Lester Stirling, Salinas, and Knud J. W. Freitag, Oakland, Calif.; said Freitag assignor to said Stirling Application August 20, 1934, Serial No. 740,576

4 Claims. (Cl. 280—106.5)

This invention relates to motor trucks and the invention has for its objects improvements in such trucks as used in farming fields for the harvesting of vegetable crops, etc., whereby working between rows of growing vegetables will be greatly expedited. Detailed advantages of the construction will appear in the following description and accompanying drawings.

In the drawings Fig. 1 is a perspective view of our improved truck in a lettuce field with a row of crates thereon.

Fig. 2 is a plan view of the truck in reduced scale.

Fig. 3 is an enlarged plan view of the rear portion of the truck showing the tandem wheels and spring suspension on auxiliary transverse frame.

Fig. 4 is a side elevation of Fig. 3 with the near wheels partly broken away to reveal the spring suspension and associated construction.

Figure 1:
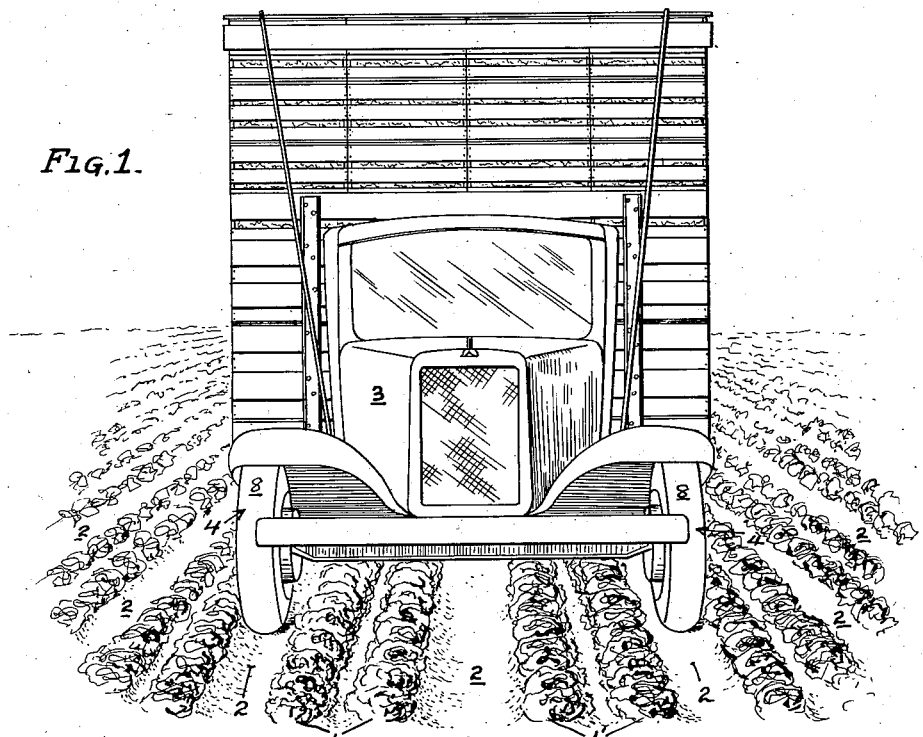

Before describing the drawings in detail it may be said that in the wholesale growing of garden vegetables, sugar beets, lettuce, etc., much loss of valuable material is caused by injury by the necessary use of motor trucks which are piloted to run with the wheels between the rows of growing plants. This is especially so in the raising of lettuce in the Salinas Valley, California, where thousands of acres are devoted to the growing of this plant, and for the reason that the lettuce is grown in double hills or double rows on a hill and the generally adopted spacing of the hills with a rather narrow furrow with two rows of lettuce on each side, as adopted for greatest practicable production, does not bring the wheels of standard gage (about 56") motor trucks such as the "Ford" truck properly into the furrows between the hills, but would roll on a hill of the plants. Any sufficient change in spacing the rows in the fields cannot be considered as it would greatly reduce the acreage output, as well as interfere with the use of tractor-drawn harrows or cultivators which are all built to suit the adopted lettuce farming practice.

Accordingly, heretofore it has been necessary to establish trucking roads at regular intervals through the great lettuce fields, use standard motor trucks on these roads, and carry empty crates from the trucks to the lettuce pickers and again carry the filled crates back to the trucks by hand, a very laborious and expensive proceeding, as the roads leading across the fields must necessarily be quite a distance apart, as much valuable crop soil must be sacrificed to make them.

In trying to overcome both the excessive labor mentioned as well as the loss of valuable land given up to road purposes we conceived the idea of widening the gage of the wheels of standard motor trucks so as to fit within the furrows between the hills, but soon found that on account of the heavy loads to be hauled (several tons), and the soft tilled soil, that no four-wheel truck could be used even with very large tires. Also, that double wheels on both ends of the driving axle to reduce the weight on any one tire could not be used as there is not sufficient room in the furrows to receive them and great injury to the lettuce plants resulted. We finally discovered that a motor truck provided with six wheels with the three on each side in tandem and with the gage widened out to about 76 inches so as to fit centrally in the furrows while straddling four rows of lettuce would solve the problem of giving the required traction and at the same time provide for any oil drippage into the central and two wheel furrows without injury to the plants. We also found that to construct such a truck with a frame and spring suspension of the width required ran into great expense but that by lengthening the axles, axle housings, draw link and braces, of a standard truck such as the "Ford" truck, and then arranging a special frame extending transversely under and outwardly beyond the chassis frame to carry the spring suspension close to the wheels which would thus be a considerable distance outward from the chassis frame, a suitable farming truck could be produced from a standard motor truck at a cost within the reach of the farmer. Other features will appear in the description.

When farming with these improved field trucks all roads in the fields are omitted and the soil all used for productive purposes, except at the two borders of the fields at the ends of the rows a sufficient margin for driving the trucks on and off of the properties and turning into the furrows must be preserved, but this was also necessary where the through roads were used so as to get to any of them; or in place of the two end margins a single central transverse road may be used and which will still further reduce the land wastage.

The saving effected by the improved system of lettuce and other similar farming carried out with the aid of the new motor field trucks runs into hundreds of thousands of dollars a year in California alone and was not possible until the perfection of our invention.

The truck may be provided with any desired form of body, but for lettuce and other farming a flat platform body capable of holding a large number of field boxes or crates is required. Also, to secure the utmost capacity we lengthen the standard light motor truck frame so as to get a longer body.

In the drawings Fig. 1 shows at 1, 1' the double rows of lettuce with furrows 2 and the truck 3 with its wheels 4 in the furrows and straddling four rows of lettuce, while under the central part of the truck extends a furrow which will catch most of the oil and water drips common to motor trucks. The truck has a wide flat platform body 5 here shown piled high with lettuce crates, the picture being copied from an actual photograph of a truck in regular usage in the Salinas lettuce fields in which most of the lettuce used in the United States is grown.

In Fig. 2 the truck chassis frame is indicated at 6 and comprises a pair of relatively large channel members bolted or riveted over the outer sides of the smaller channel side frame members 7 with which the common trucks such as the Ford, Chevrolet, etc. are furnished, and it is on these enlarged channel members that the flat body is mounted.

The front wheels 8 of the truck are spread apart to the widened gage, preferably by piercing the front axle and welding, and suitably lengthening the drag link, brake actuators, etc., not shown.

The rear driving wheels 9 are also spread apart by suitably cutting and piecing the axle housings at points 10 and the axles within, also the angular brace rods 11, if any, normally furnished with the car, are connected to a new pair of ears 12 welded in place on the forward portion of the torque tube 13, as the old ears 12' will be too far away.

An additional rear axle housing 15 is provided complete with axles and additional rear wheels 9' in tandem with the driving wheels all suspended on leaf road springs 16 in the well-known way, generaly known as the Timkin conversion unit or assemblage, and which includes a plurality of radius rods 18, 19 for steadying the rear axle housing, the forward or driving axle being steadied by the torque tube and/or angular braces indicated.

In the regular Timkin conversion unit, however, the two outer radius rods 18 are pivotally anchored close to the sides of the leaf road springs and chassis frame, but in the present construction they are anchored to brackets 20 under the chassis frame, and the spring suspension is pushed away out beyond the chassis frame and carried at the ends of a heavy transverse pin or shaft 21 in turn carried by an auxiliary frame consisting of a pair of I beams or channels 22 extending transversely of and beneath the chassis frame, firmly welded and/or bolted thereto and suitably braced as at 23, and which auxiliary frame carries the brackets 24 which support the shaft 21 on which the spring bracket 24' turns.

These transverse beams or channels lie to either side of a main frame cross member 28 of the original chassis frame of the car and which is additionally secured to the larger chassis channels 6 as by blocks or brackets 25 welded or bolted in place.

Figure 5:
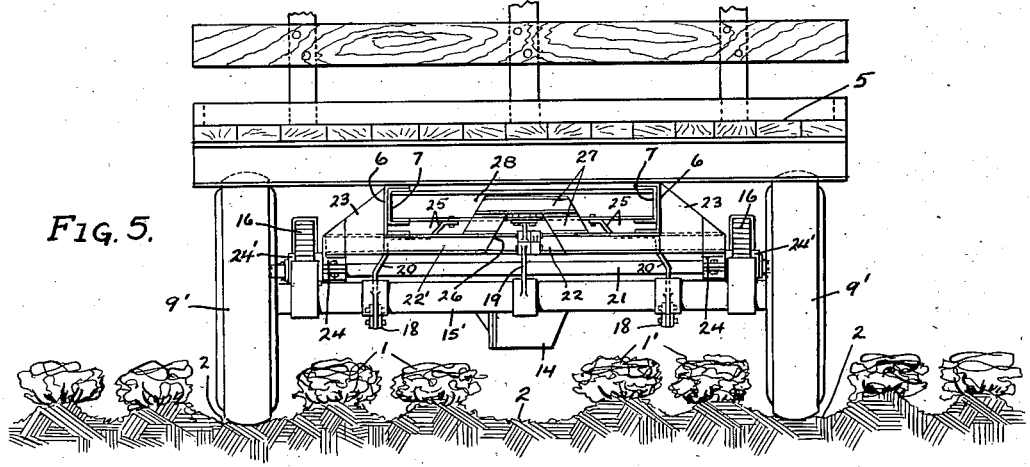
Fig. 5 is a rear elevation showing the transverse frame, radius rod brackets and the relation of the wheels and brackets to the lettuce rows.

In widening the gage by thus spreading the wheels we at first also spread the radius rods 18 with the spring suspension, but found that projected directly down into the rows of growing lettuce to greatly damage the same, and in the position now adopted they entirely clear the plants as shown in Fig. 5.

The central radius rod is on top of the rear auxiliary axle housing, and to permit it to swing freely we provide an offset 26 in the rear member 22' of the transverse frame as shown in Fig. 5 and wherein the member is built up out of I beam sections by welding one upon the other as indicated at 27, 27, though it is, of course, evident that a forging of this offset or yoke shape could be used.

While we show the adaptation of the Timkin six-wheel unit to our truck, this is illustrative merely, as the details of the wheel assemblage is not important apart from the features stressed. The various other well-known features of motor car construction such as brake-operating mechanisms, etc., have been omitted as having nothing to do with the invention claimed herein. Also, while we show the invention applied to a "Ford" truck, this is optional, as other small motor trucks may also be used with suitable slight variation of constructional detail.

In view of the above the invention will be seen to comprise not only a specially constructed field motor truck but a new system of harvesting lettuce or other similar garden truck without the requirement of service roads run through the fields whereby the yield per acre is considerably increased, injury to the growing plants is eliminated, and the labor and expense of harvesting is much reduced.

We therefore claim:—

1. A motor truck having a body supported on a longitudinally extending chassis frame, a plurality of road wheels on axles at the rear of the truck, an auxiliary frame member extending transversely of said chassis frame supporting said wheels at a relatively great distance outward from said chassis frame, said auxiliary frame passing under said chassis frame and rigidly secured thereto and provided with an offset intermediate of the chassis frame sides, and a radius rod steadying the axle of the road wheels operating in said offset.

2. A motor truck having a body supported on a longitudinally extending chassis frame, a plurality of road wheels on axles at the rear of the truck, and an elongated auxiliary frame member extending transversely of said chassis frame and projecting considerably beyond both sides of the chassis frame, and means at the outer ends of said auxiliary frame supporting said wheels at a relatively great distance outward from said chassis frame, said auxiliary frame passing under said chassis frame and rigidly secured thereto, there being two rear road wheels in tandem at each side of the truck complete with axles and axle housings and road springs, and a plurality of axle housing radius rods connected to the rearmost axle housing positioned parallel with and adjacent the sides of the chassis frame, the rods being spaced inwardly a considerable distance from the wheel spring suspension.

3. A motor truck having a chassis frame, a plurality of road wheels at the rear of the truck, an elongated auxiliary frame extending transversely of said chassis frame rigidly secured thereto and projecting a substantial distance beyond both sides thereof, brackets at the ends of said auxiliary frame spaced outwardly of the chassis frame, a shaft extending transversely of the chassis frame and supported adjacent its ends by said brackets, road springs pivotally supported by the ends of said shaft at the outer sides of said brackets and in turn supporting said wheels.

4. A motor truck having a chassis frame, a plurality of road wheels at the rear of the truck, an elongated auxiliary frame extending transversely of said chassis frame rigidly secured thereto and projecting a substantial distance beyond both sides thereof, brackets at the ends of said auxiliary frame spaced outwardly of the chassis frame, a shaft extending transversely of the chassis frame and supported adjacent its ends by said brackets, road springs pivotally supported by the ends of said shaft at the outer sides of said brackets and in turn supporting said wheels, said auxiliary frame comprising a plurality of spaced steel beam members extending across underneath and secured to the chassis frame, and said brackets secured to and joining the outer ends of said beams.

ROBERT LESTER STIRLING.
KNUD J. W. FREITAG.